United States Patent
Liu et al.

(10) Patent No.: US 10,871,985 B2
(45) Date of Patent: Dec. 22, 2020

(54) DISPLAYING MEDIA FILES BETWEEN CHANGES IN STATES OF AN APPLICATION CLIENT

(71) Applicant: Tencent Technology (Shenzhen) Company Limited, Shenzhen (CN)

(72) Inventors: Qiang Liu, Shenzhen (CN); Lei Jiang, Shenzhen (CN); Ruijie Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 227 days.

(21) Appl. No.: 16/049,429

(22) Filed: Jul. 30, 2018

(65) Prior Publication Data

US 2018/0336060 A1    Nov. 22, 2018

Related U.S. Application Data

(63) Continuation of application No. PCT/CN2017/086913, filed on Jun. 2, 2017.

(30) Foreign Application Priority Data

Jun. 7, 2016    (CN) .......................... 2016 1 0398860

(51) Int. Cl.
*G06F 9/48*    (2006.01)
*G06F 16/44*    (2019.01)
(Continued)

(52) U.S. Cl.
CPC ............ *G06F 9/485* (2013.01); *G06F 3/0481* (2013.01); *G06F 9/48* (2013.01); *G06F 16/44* (2019.01); *G06F 3/0484* (2013.01)

(58) Field of Classification Search
None
See application file for complete search history.

(56) References Cited

U.S. PATENT DOCUMENTS

2009/0172576 A1    7/2009    Cheaz
2012/0174020 A1    7/2012    Bell et al.

FOREIGN PATENT DOCUMENTS

CN    101655808 A    2/2010
CN    102298538 A    12/2011
(Continued)

OTHER PUBLICATIONS

Tencent Technology, ISRWO, PCT/CN2017/086913, Sep. 4, 2017, 7 pgs.

(Continued)

*Primary Examiner* — Eric C Wai
(74) *Attorney, Agent, or Firm* — Morgan, Lewis & Bockius LLP

(57) ABSTRACT

A media file presentation method is disclosed, applicable to an application client and performed at a computing device. The computing device performs a blocking operation on a process of switching from a background state to a suspended state and covers a page screenshot by using a to-be-presented media file in the process of switching from the background state to the suspended state, the page screenshot being captured in a process of switching from a foreground state to the background state. Finally, the computing device presents the media file covering the page screenshot in a process of switching from the suspended state to the foreground state.

20 Claims, 11 Drawing Sheets

(51) Int. Cl.
 G06F 3/0481 (2013.01)
 G06F 3/0484 (2013.01)

(56) References Cited

FOREIGN PATENT DOCUMENTS

| | | |
|---|---|---|
| CN | 103309688 A | 9/2013 |
| CN | 104238880 A | 12/2014 |
| CN | 104239136 A | 12/2014 |
| CN | 104915208 A | 9/2015 |
| CN | 105117186 A | 12/2015 |
| CN | 106095551 A | 11/2016 |

OTHER PUBLICATIONS

Tencent Technology, IPRP, PCT/CN2017/086913, Dec. 11, 2018, 6 pgs.

DISPLAYING MEDIA FILES BETWEEN CHANGES IN STATES OF AN APPLICATION CLIENT

PRIORITY CLAIM AND RELATED APPLICATION

This application is a continuation application of PCT/CN2017/086913, entitled "MEDIA FILE PRESENTATION METHOD, TERMINAL, AND STORAGE MEDIUM" filed on Jun. 2, 2017, which claims priority to Chinese Patent Application No. 201610398860.4, filed with the Chinese Patent Office on Jun. 7, 2016 and entitled "MEDIA FILE PRESENTATION METHOD, TERMINAL, AND STORAGE MEDIUM", both of which are incorporated herein by reference in their entirety.

FIELD OF THE TECHNOLOGY

This application relates to the field of computer technologies, and in particular, to a media file presentation method, a terminal, and a storage medium.

BACKGROUND OF THE DISCLOSURE

Currently, a media file pushed by a server may be presented in a process of starting an application client. Information that may be useful to a user may be presented to the user during the period of time for starting the application client, thereby providing a new way for providing information for a user. For example, a media file may be presented in a process of starting an application client, so that a user may view the media file in a process of waiting for the starting of the application client.

However, as memory capacity of a terminal is entirely increased currently, more application clients that are in a suspended state are stored in the memory for a long period of time. When needing to be used, the application client may be directly switched from the suspended state to a foreground state, without a need to going through a long starting process, and a quantity of starting times of the application client is reduced. In this way, an impression rate of a media file presented by using the application client is reduced, and consequently, opportunities for presenting a media file to a user to provide information are reduced.

SUMMARY

According to embodiments of this application, a media file presentation method, a terminal, and a storage medium are provided.

A first aspect of the present disclosure provides a media file presentation method, applicable to an application client and performed at a computing device having one or more processors and memory storing a plurality of programs to be executed by the one or more processors, the method comprising:

performing a blocking operation on a process of switching from a background state to a suspended state;

covering a page screenshot by using a to-be-presented media file in the process of switching from the background state to the suspended state, the page screenshot being captured in a process of switching from a foreground state to the background state; and presenting the media file covering the page screenshot in a process of switching from the suspended state to the foreground state.

A second aspect of the present disclosure provides a computing device, comprising one or more processors, a memory, and a plurality of computer readable instructions that, when executed by the one or more processors, cause the computing device to perform the aforementioned media file presentation method.

A third aspect of the present disclosure provides a non-transitory computer readable storage medium storing a plurality of computer readable instructions in connection with a computing device having one or more processors, wherein the plurality of computer readable instructions, when executed by the one or more processors, cause the computing device to perform the aforementioned media file presentation method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used for explaining this application but are not intended to limit this application.

Figure 1:
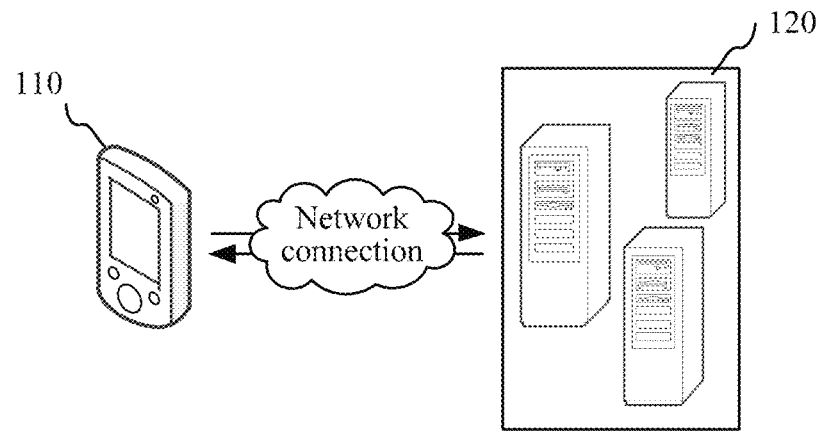
FIG. 1 is an environment diagram of an application client of a media file promotion system according to an embodiment.

As shown in FIG. 1, in an embodiment, a media file promotion system is provided, including a terminal 110 and a server 120. The server 120 may be an independent physical server or a server cluster. The server 120 may be specifically configured to: distribute a media file and a corresponding configuration file to the terminal 110, collect a quantity of presentation times of the media file of the terminal 110, count the quantity, trigger an end presentation command when the counted quantity of presentation times of the media file meets a triggering condition, and send the end presentation command to the terminal 110. The terminal 110 may be configured to: receive the media file and the corresponding configuration file that are delivered by the server, and perform, according to the configuration file, a blocking operation on a process of switching from a background state to a suspended state; cover a page screenshot by using a to-be-presented media file in the process of switching from the background state to the suspended state, the page screenshot being captured in a process of switching from a foreground state to the background state; and present the media file covering the page screenshot in a process of switching from the suspended state to the foreground state.

Figure 2:
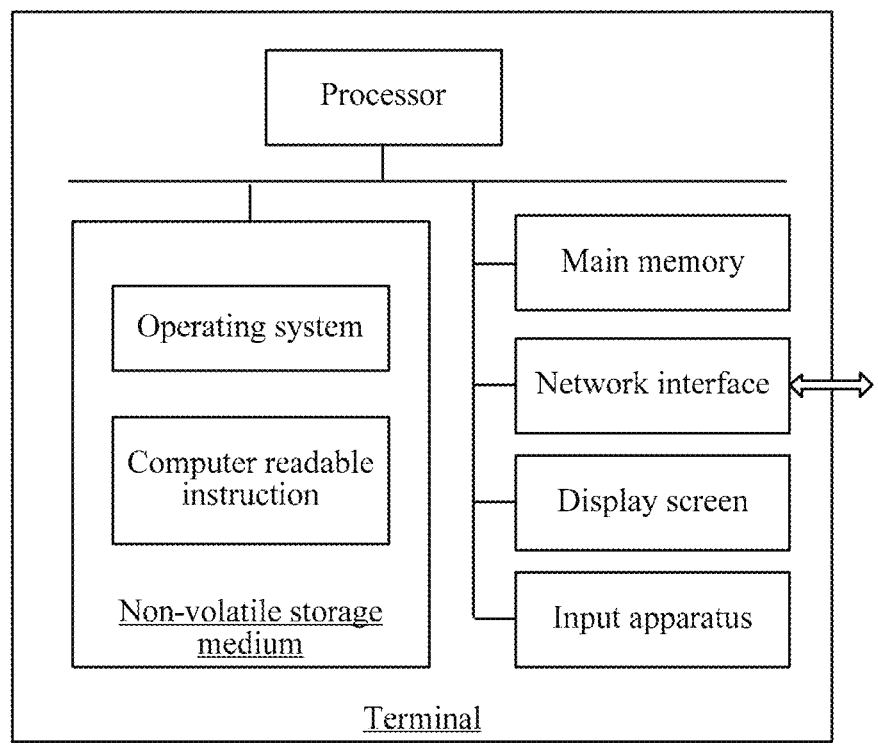
FIG. 2 is a schematic diagram of an internal structure of a terminal according to an embodiment.

As shown in FIG. 2, an embodiment provides a terminal, including: a processor, a non-transitory computer readable storage medium, a main memory, a network interface, a display screen, and an input apparatus that are connected by using a system bus. The non-transitory computer readable storage medium of the terminal stores an operating system, and may further store a computer readable instruction. When the computer readable instruction is executed by the processor, a media file presentation method can be implemented. The processor is configured to provide computing and control capabilities to support running of the entire terminal. The main memory in the terminal may store a computer readable instruction. When executed by the processor, the computer readable instruction can cause the processor to perform the media file presentation method. The network interface is configured to perform network communication with a server, for example, receive a media file and a corresponding configuration file that are delivered by the server, report a quantity of presentation times of the media file to the server, receive an end presentation command, and the like. The display screen of the terminal may be a liquid crystal display screen, an e-ink display screen, or the like. The input apparatus may be a touch layer covering the display screen, or may be a key, a track ball, or a touchpad disposed on a housing of the terminal, or may be an external keyboard, touchpad, or mouse. The terminal may be a mobile terminal such as a mobile phone, a tablet computer, or a personal digital assistant, or may be a wearable device, or the like. A person skilled in the art may understand that, in the structure shown in FIG. 2, only a block diagram of a partial structure related to a solution in this application is shown, and this does not constitute a limit to the terminal to which the solution in this application is applied. Specifically, the terminal may include more components or fewer components than those shown in the figure, or some components may be combined, or a different component deployment may be used.

Figure 3:
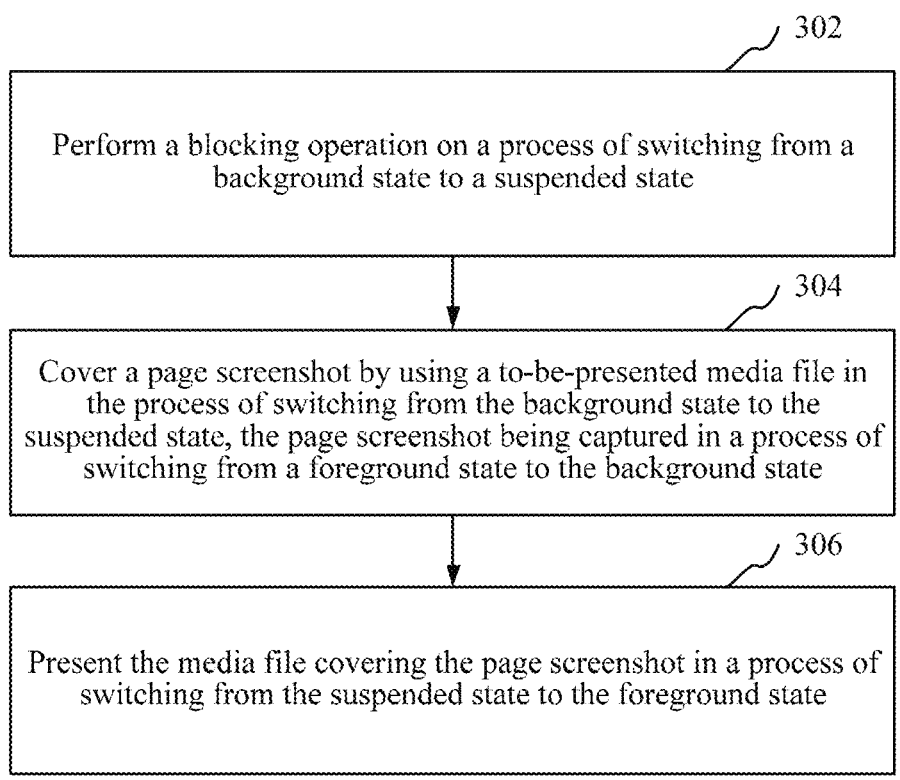
FIG. 3 is a schematic flowchart of a media file presentation method according to an embodiment.

As shown in FIG. 3, in an embodiment, a media file presentation method is provided. This embodiment is described by using an example in which the method is applied to the terminal 110 in FIG. 1. The method specifically includes the following steps:

Step 302. Perform a blocking operation on a process of switching from a background state to a suspended state.

The application client is a program that can run on the terminal, or may be various application clients that can be switched between a foreground state, a background state, and a suspended state, such as an instant messaging application client, a browser, a game application client, or an office application client.

The blocking operation is an operation of suspending a target event, reserving operation data the target event, and restoring running of the target event when the blocking operation ends. The blocking operation may be implemented by using a delay function. The delay function may be a sleep( ) function (a delay is measured in seconds) or an usleep( ) function (a delay is measured in milliseconds), or the like.

Figure 4:
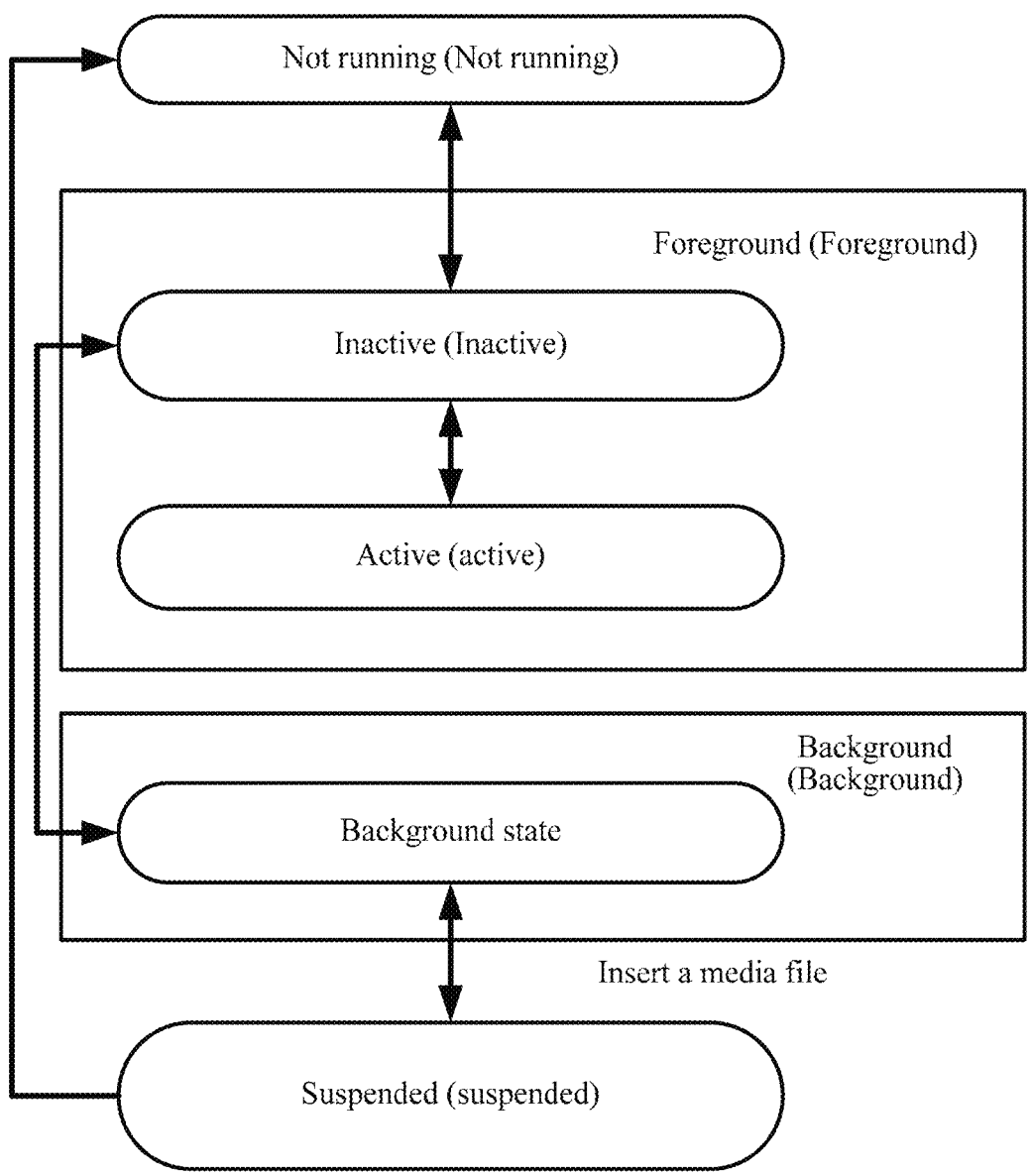
FIG. 4 is a schematic diagram of different states of an application client and a relationship between the different states according to an embodiment.

The application client may in different states when running on an operating system. The operating system herein may be, for example, an Android operating system, a Windows operating system, or an iOS operating system. For the different states of the application client and a relationship between the different states, refer to FIG. 4. A status of the application client specifically includes a not-running state, a foreground state, a background state, and a suspended state, and the foreground state includes an active state and an inactive state.

The not-running state indicates that the application client is not started. The inactive state indicates that the application client runs in the foreground but does not receive any event, and the application client usually remains in the inactive state when there is no event to be processed. The active state indicates that the application client runs in the foreground and receives an event. When there is no event for processing, the application client usually remains in the inactive state, and when the application client receives an event, the application client is switched to the active state. That the application client runs in the foreground refers to a state in which the application client may be operated directly and makes a response.

The background state indicates that the application client runs in the background and can execute code. Most application clients remain in the background state for a period of time after entering the background state, and then enter the suspended state. The suspended state indicates that the application client runs in the background and cannot execute code. That the application client runs in the background means that the application client cannot be operated directly but can execute code. Some application clients may remain in the background state for a long time after making a request. The application client is automatically changed from the background state to the suspended state by the operating system without a need to send a notification. An application client that is in the suspended state still remains in memory. When there is little memory remaining, the operating system preferentially removes the application client that is in the suspended state, to provide more memory for an application client that is in the foreground state.

In an embodiment, step 302 includes: performing, after the application client is switched from the foreground state to the background state, a blocking operation of blocking, for first preset duration, a process of switching the application client from background state to the suspended state. The first preset duration is a preset length of time. The first preset duration may be selected as required, for example, any value of 0.1 to 5 seconds.

In an embodiment, the terminal may detect a first application client state switching instruction by using the operating system, and switch the application client from the foreground state to the background state according to the first application client state switching instruction. The first application client state switching instruction may be triggered by an operation of switching the application client or an operation of returning to a system desktop. The operation of switching the application client may be an operation performed on an icon corresponding to a to-be-switched application client, such as a click on the icon, or may be an operation of returning to a historical application client, or the like.

Further, the terminal may detect a status change of the application client by using the application client. After detecting that the application client is switched by the operating system from the foreground state to the background state, the terminal performs the blocking operation on the process of switching the application client from the background state to the suspended state. The blocking operation makes the process of switching the application client from the background state to the suspended state be hijacked, and field data required for switching from the background state to the suspended state is maintained. After the blocking lasts for first preset duration, the operating system continues to switch the application client from the background state to the suspended state by using the maintained field data. The hijacking herein is processor time sequence hijacking. The processor time sequence hijacking refers to a process in which a new event is inserted, by using a blocking and insertion method, before an event that is about to occur, a site of a hijacked event is well maintained at the same time, and after the insertion is completed, the hijacked event can be resumed. After the application client is switched by the operating system from the foreground state to the background state, process data of the application client is stored by the operating system in the memory.

Step 304. Cover a page screenshot by using a to-be-presented media file in the process of switching from the background state to the suspended state, the page screenshot being captured in a process of switching from a foreground state to the background state.

The page screenshot is a screenshot of a presentation page when the application client is switched from the foreground to the background. The media file may be data that may be presented, including at least one of a picture, a video, or an animation file. The media file may be a media file promoted by the server, for example, an advertisement media file, a public welfare publicity media file, or an activity promotion media file. Content in the advertisement media file may reflect an attribute of a promoted product. The media file may be a user-defined media file or a media file automatically downloaded from the Internet, or the like. The terminal may store a media file library including media files, and may obtain a media file in order or randomly from the media file library when obtaining the media file. The obtained media file may match a size of a display screen of the terminal. When the obtained media file do not match the size of the display screen, the media file may be compressed or stretched so that the media file matches the size of the display screen.

Specifically, when switching the application client from the foreground state to the background state by using the operating system, the terminal captures a screenshot of a page presented by the application client that is in the foreground state before the application client is switched to the background state, and this is referred to as a page screenshot. The page screenshot is stored in a system screenshot drawing of the operating system. The terminal obtains, by using the application client and in a process in which the application client is to be switched by the operating system from the background state to the suspended state, a media file that needs to be presented, and covers the system screenshot drawing by using the media file, to cover the page screenshot in the system screenshot drawing.

Figure 5:
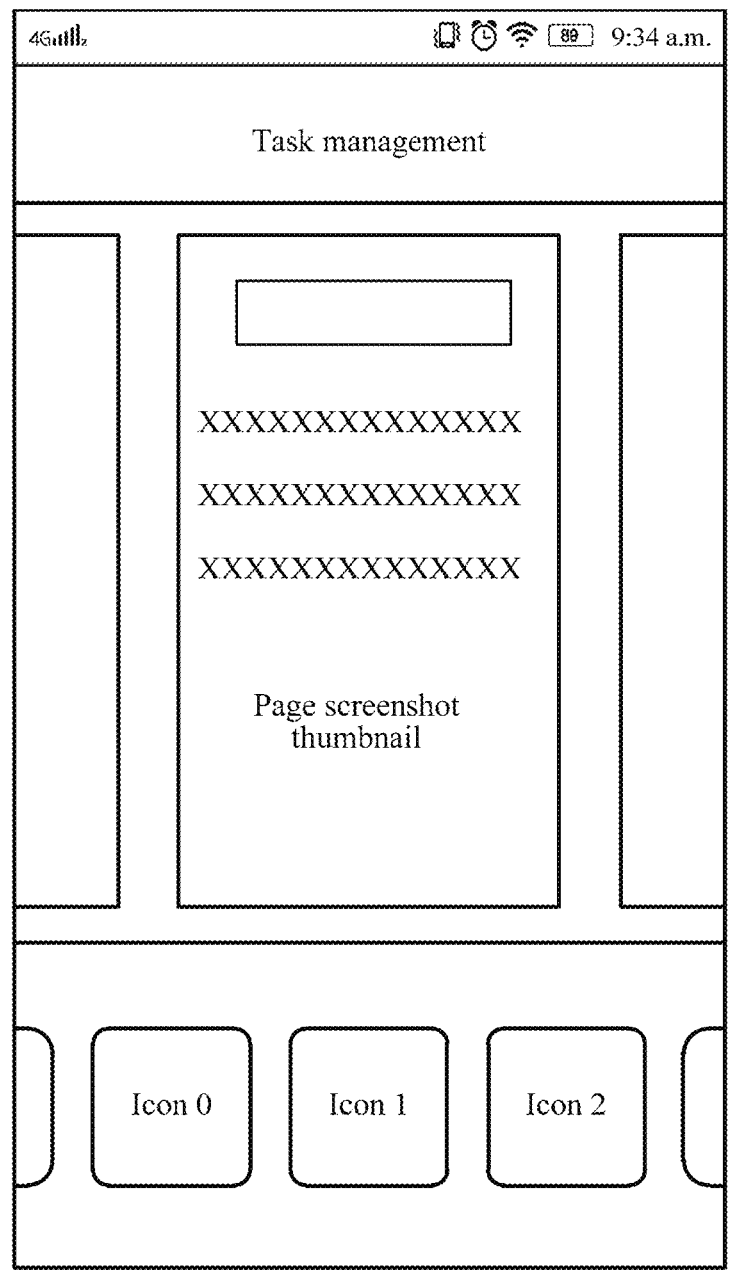
FIG. 5 is a schematic diagram of a task management page presented on a terminal when a page screenshot is not covered according to an embodiment.
Figure 6:
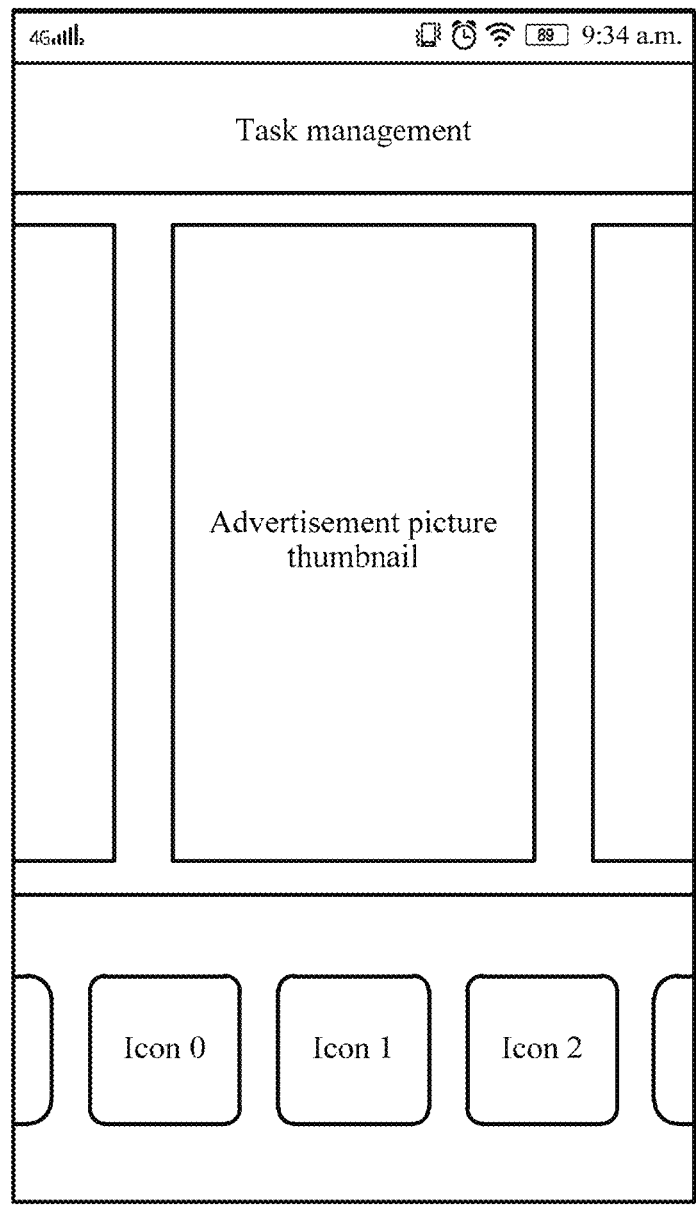
FIG. 6 is a schematic diagram of a task management page presented on a terminal when a media file covers a page screenshot according to another embodiment.

For example, in a normal case, the terminal enters, by using the operating system, a task management page shown in FIG. 5. A page screenshot of each application client that is currently in the background state or the suspended state is to be presented on the task management page. The page screenshot represents the page of the application client in the foreground state that is captured before the corresponding application client enters the background state from the foreground state. After performing step 304, the terminal enters, by using the operating system, a task management page shown in FIG. 6. A presented page screenshot has been covered by an advertisement media file on the task management page.

Step 306. Present the media file covering the page screenshot in a process of switching from the suspended state to the foreground state.

Specifically, the terminal may detect a second application client state switching instruction by using the operating system, and switch the application client from the suspended state to the foreground state according to the second application client state switching instruction. The second application client state switching instruction may be triggered by an operation of switching the application client, for example, an operation performed on an icon corresponding to a to-be-switched application client, such as a click on the media file.

Further, the terminal may detect a status change of the application client by using the application client. If detecting that the application client is switched by the operating system from the suspended state to the not-running state and then to the foreground state, the terminal obtains the media file that covers the page screenshot and that is provided by the operating system, and places the media file on a frontmost layer for presentation. The media file may be presented in full screen.

In an embodiment, before step 306, the media file presentation method further includes: detecting a query instruction for querying an application client that is in the background state or the suspended state; presenting, according to the query instruction, a thumbnail corresponding to the application client, the presented thumbnail being a thumbnail of the media file; detecting a triggering operation performed on the thumbnail; and switch the application client from the suspended state to the foreground state according to the triggering operation. When being switching from the suspended state to the foreground state, the application client obtains process data stored by the operating system, thereby resuming the application client to the foreground state according to the obtained process data.

In an embodiment, after step 306, the method further includes: entering, when the media file has been presented for second preset duration, a page that is presented when the application client is switched from the foreground state to the background state.

The second preset duration is a preset length of time, and may be a length of time different from the first preset duration.

Specifically, the terminal may invoke, by using the application client, a timer for timing when the terminal starts to present the obtained media file, and ends the presentation of the media file and the timing when the timing reaches the second preset duration, to enter a page of an application client that is in the foreground state. Specifically, the terminal may enter a page presented before the application client is switched from the foreground state to the background state. The application client may immediately enter a corresponding application client page after being switched from the suspended state to the foreground state, and may be covered by the media file presented on the frontmost layer. After the presentation of the media file is completed, the application client page is displayed.

Figure 7:
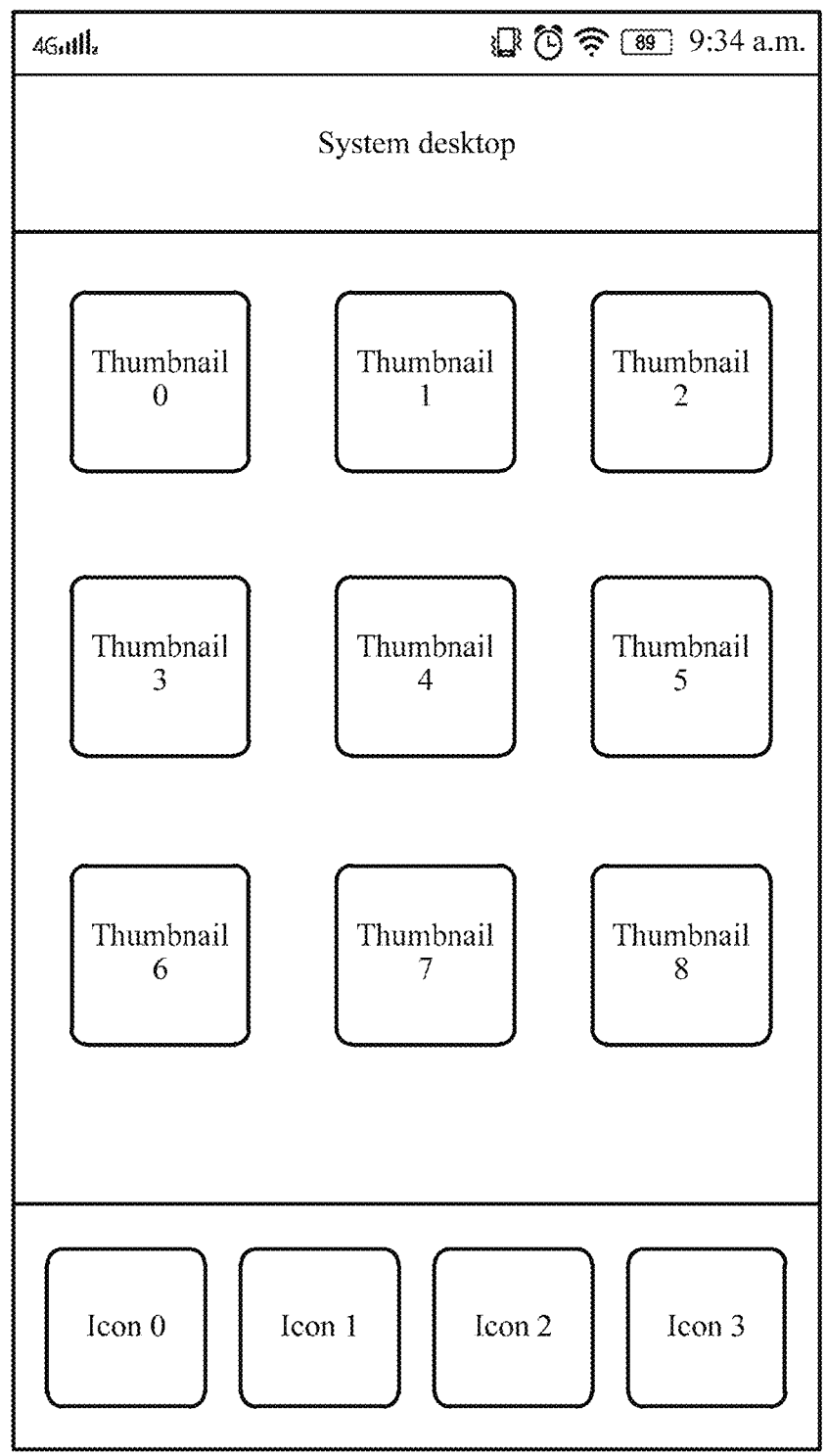
FIG. 7 is a schematic diagram of a system desktop presented on a terminal according to an embodiment.
Figure 8:
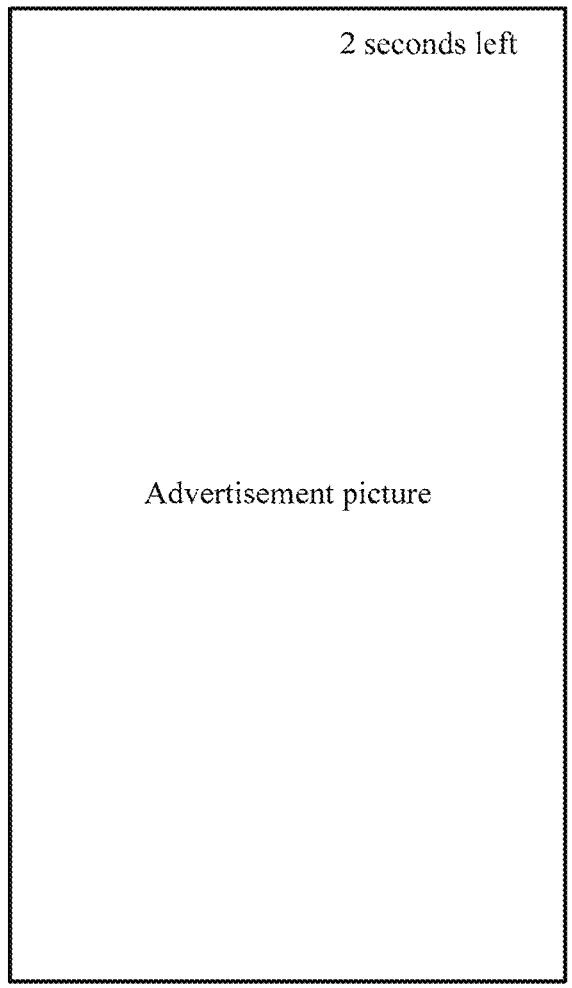
FIG. 8 is a schematic diagram showing that a terminal presents a media file when an application client is switched from a suspended state to a foreground state according to an embodiment.
Figure 9:
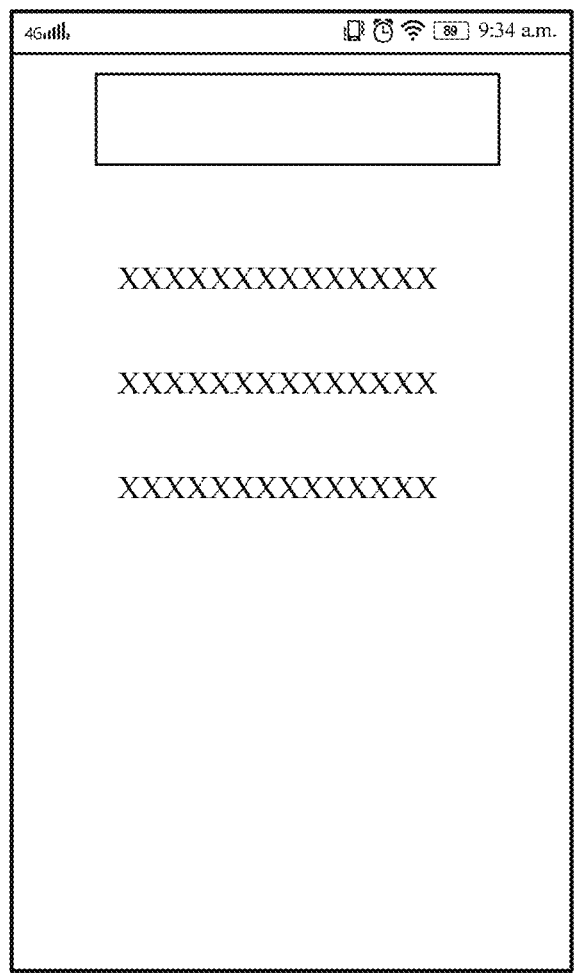
FIG. 9 is a schematic diagram of an entered application client page when a media file has been presented for second preset duration according to an embodiment.

For example, the terminal may present a system desktop as shown in FIG. 7, and present an icon of each application client on the system desktop. After detecting, by using the operating system, the second application client state switching instruction for switching to the application client used for presenting the media file, the terminal obtains, according to the second application client state switching instruction by using the operating system, the media file covering the page screenshot, and presents the media file in a form shown in FIG. 8. When the media file has been presented for the second preset duration, the terminal enters an application client page shown in FIG. 9.

According to the media file presentation method, the application client is switched between states, and the blocking operation is performed on the process of switching from the background state to the suspended state, to buy time for a subsequent operation of covering the page screenshot, thereby improving a success rate of the operation of covering the page screenshot. When the application client is switched from the suspended state to the foreground state, the media file can be obtained and presented. This provides a new manner of presenting the media file, increases an impression rate of the media file, and can ensure the success rate of presenting the media file when the application client is switched from the suspended state to the foreground state.

In an embodiment, step 302 includes: performing a blocking operation on a process in which an operating system switches the application client from the background state to the suspended state. Step 304 includes: covering the page screenshot by using the to-be-presented media file in the process in which the operating system switches the application client from the background state to the suspended state, the page screenshot being captured when the operating system switches the application client from the foreground state to the background state. Step 306 includes: presenting the media file covering the page screenshot when the operating system switches the application client from the suspended state to the foreground state.

In this embodiment, the blocking operation is performed on the process in which the operating system switches the application client from the background state to the suspended state, to buy time for the subsequent operation of covering the page screenshot, thereby improving a success rate of the operation of covering the page screenshot captured by the operating system. When the application client is switched the operating system from the suspended state to the foreground state, the media file can be obtained and presented. The application client is switched by the operating system between states, so that a new manner of presenting the media file is provided, an impression rate of the media file is increased, and the success rate of presenting the media file when the application client is switched from the suspended state to the foreground state can be ensured.

In an embodiment, the media file presentation method further includes: receiving a media file and a corresponding configuration file that are delivered by a server and storing the media file and the configuration file. The presenting the media file covering the page screenshot includes: presenting the media file covering the page screenshot according to a presentation parameter in the stored configuration file. The step of receiving a media file and a corresponding configuration file that are delivered by a server and storing the media file and the configuration file may be performed before a step of obtaining the media file in the process of switching the application client from the background state to the suspended state.

Specifically, operation and maintenance personnel may access the server by managing a terminal, configure the media file and the corresponding configuration file on the server, and configure a delivery time period corresponding to the media file and the configuration file. The server may detect whether a current time falls within the delivery time period, and if yes, deliver the media file and the corresponding configuration file to the terminal. The server may specifically push the media file and the corresponding configuration file to the terminal, or push a media file update notification to the terminal, so that the terminal proactively downloads the media file and the corresponding configuration file according to the media file update notification.

After receiving the media file and the corresponding configuration file that are delivered by the server, the terminal may replace, with the received media file and corresponding configuration file, a media file and a corresponding configuration file that are locally stored in the terminal previously, or may retain a media file and a corresponding configuration file that are locally stored previously, and additionally store the received media file and corresponding configuration file. A correspondence between the media file and the configuration file may be set by using their file names.

The terminal obtains, in the process in which the application client is switched from the background state to the suspended state, the received and stored media file and corresponding configuration file, reads a presentation parameter in the corresponding configuration file, and further presents the obtained media file according to the presentation parameter. The presentation parameter is a parameter for describing a media file presentation policy. The presentation parameter may include the second preset duration. In an embodiment, the presentation parameter may further include a triggering link address of the media file and/or a size of the media file. The media file triggering link address is a link address that is accessible after a triggering operation is performed on the media file.

In this embodiment, the media file configured by the server may be presented, when the application client is switched from the suspended state to the foreground state, by using the media file and the configuration file that are configured by the server, and the media file is presented according to the presentation parameter configured by the server. The media file presented by using the application client and the presentation manner may be managed by the server remotely. This is highly controllable.

In an embodiment, the configuration file includes a media file presentation condition. Step 302 includes: detecting whether the media file presentation condition is met; and performing, when the media file presentation condition is met, the blocking operation on the process of switching from the background state to the suspended state.

Specifically, the terminal may detect, after the application client is switched from the foreground state to the background state, whether the media file presentation condition is met, and if yes, perform a blocking operation of blocking, for first preset duration, on a process of switching the application client from the background state to the suspended state, or if not, the detection is ended, and the operating system processes switching of states of the application client. The media file presentation condition is a condition that should be met when the media file presentation method of this embodiment is triggered to present the media file.

In this embodiment, when the application client is switched from the suspended state to the foreground state, and after the application client is switched from the foreground state to the background state, whether the media file presentation condition is met may be detected by using the media file and the configuration file that are configured by the server, so that the media file is presented when the application client is switched from the suspended state to the foreground state. The media file presented by using the application client, the presentation manner, and a presentation occasion may be managed by the server remotely, so that the media file can be more controllably presented.

In an embodiment, a media file presentation condition may specifically include at least one of a presentation time condition that needs to be met when the media file is presented or a condition for a quantity of presentation times. For example, the presentation time condition is that the media file is presented, when the application client is switched from the suspended state to the foreground state, by using the application client within a presentation time period specified by the presentation time condition. Specifically, the terminal may determine, when the application client is switched from the foreground state to the background state, whether a current time is within a corresponding presentation time period, and if yes, perform a blocking operation of blocking, for the first preset duration, a process of switching the application client from the background state to the suspended state, and further may present the media file within the presentation time period when subsequently the application client is switched from the suspended state to the foreground state.

The presentation time period may be an absolute time period, and for example, may be represented by using a presentation start time and a presentation end time, or may be represented by using a presentation start time and duration. The presentation time period may be a dynamic time period. For example, preset duration starting from a time at which the application client is switched from the foreground state to the background state for the first time each day is used as the presentation time period. Different presentation time periods may be configured for different media files, so that the different media files can be presented in different time periods.

For example, the condition for a quantity of presentation times may be: before a quantity of presentation times locally on the terminal reaches a quantity of presentation times specified by the condition for a quantity of presentation times, the media file is present each time the application client is switched from the suspended state to the foreground state. Specifically, the terminal may determine, when the application client is switched from the foreground state to the background state, whether a quantity of presentation times of the media file reaches a quantity of presentation times specified by the condition for a quantity of presentation times, and if not, perform a blocking operation of blocking, for the first preset duration, on a process of switching the application client from the background state to the suspended state, and further obtain and present the media file when subsequently the application client is switched from the suspended state to the foreground state.

Figure 10:
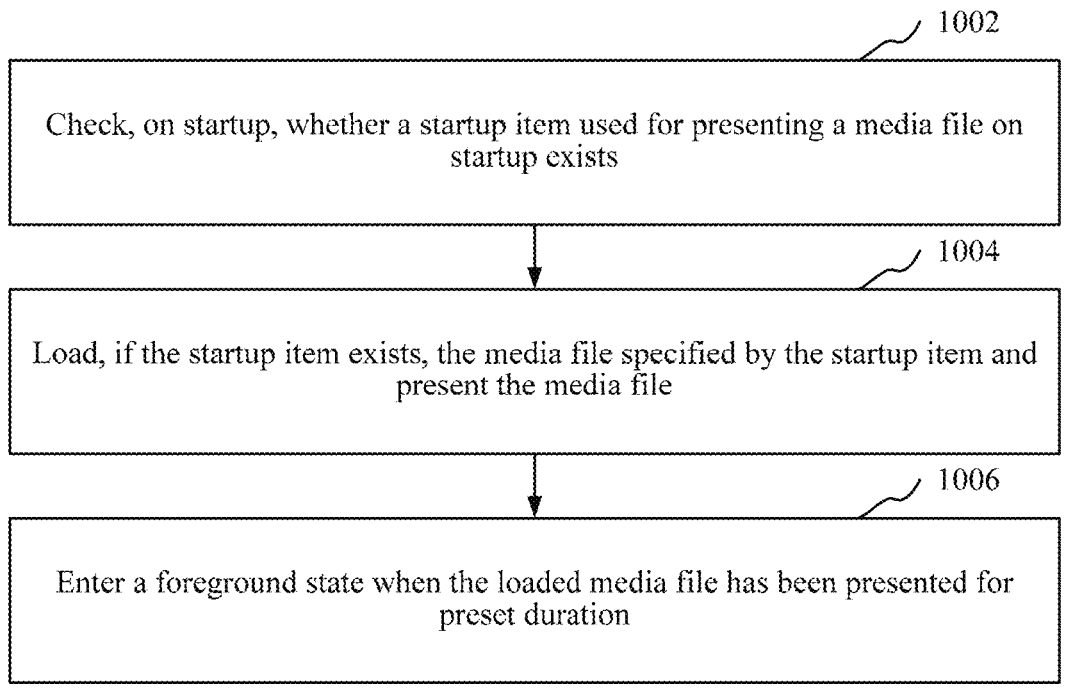
FIG. 10 is a schematic flowchart of steps for presenting a media file when an application client is started according to an embodiment.

In an embodiment, before step 302, the media file presentation method further includes a step of presenting the media file when the application client is started. As shown in FIG. 10, the step specifically includes the following steps:

Step 1002. Detect, on startup, whether a startup item used for presenting a media file on startup exists.

Specifically, the startup herein refers to a cold start of the application client, and specifically, a start of the application client for the first time or a case in which the application client is removed from memory and then restarted. Compared with the process of switching the application client from the background state to the suspended state, the cold start of the application client has a long startup time, and processing such as initialization of a resource is needed while this is not necessary in the process of switching the application client from the background state to the suspended state. The terminal may detect an application client startup instruction by using the operating system, starts the application client according to the application client startup instruction, checks a startup item of the application client, and determines whether a startup item for presenting a media file when the application client is started exists in the startup item of the application client. The startup item is an event that needs to be executed during startup of the application client.

Step 1004. Load, if the startup item exists, the media file specified by the startup item and present the media file.

Specifically, if it is determined that the startup item for presenting a media file when the application client is started exists, the terminal may load and present, by using the operating system, the media file specified by the startup item. The startup item may specify a media file by using a storage address of the media file.

Step 1006. Enter the foreground state when the loaded media file has been presented for preset duration.

Specifically, the startup item for presenting the media file when the application client is started may specify the third preset duration, and the terminal may start timing when the loaded media file is presented. When the timing reaches the third preset duration, the terminal ends the presentation of the media file and the timing, and enters a page of the application client in the foreground state. The third preset duration may be equal to the second preset duration, or may be greater than the second preset duration.

In this embodiment, when the application client is started, a media file that needs to be presented when the application client is started may be identified by using a startup item identifier, so that a manner in which the media file may be presented by taking advantage of a long startup time of the application client in the process of starting the application client, may be combined with a manner in which the media file is presented when the application client is switched from the suspended state to the foreground state, thereby further increasing an impression rate of the media file. An advertisement media file generally needs to reach fixed impression. A combination of the two presentation manners can make an advertisement media file reach fixed impression more rapidly, thereby reducing interruptions to a user.

In an embodiment, the media file presentation method further includes: receiving an end presentation command sent by a server, the end presentation command being triggered by the server when finding, through statistics collection, that a quantity of presentation times of the media file meets a triggering condition; and stopping, according to the end presentation command, performing the blocking operation on the processing of switching from the background state to the suspended state, and stopping, in the process of switching from the background state to the suspended state, covering the page screenshot by using the to-be-presented media file.

Specifically, the terminal may proactively report the quantity of presentation times of the media file, and the server collects the quantity. alternatively, the server may query, from each terminal, the quantity of presentation times of the media file and collect the quantity. The server collects statistics about the quantity of presentation times of the media file, and specifically, may collect statistics about a total quantity of presentation times of single media files of all measurable terminals, or may collect statistics about a total quantity of presentation times of all media files of a topic of all measurable terminals, or may collect statistics about a quantity of presentation times of a media file of a single terminal, or the like. Statistics collection may be performed multiple times periodically or may be performed only once. The triggering condition is a numerical condition that should be met by the quantity of presentation times obtained through statistics collection when the end presentation command is triggered, for example, the condition may be: the quantity is greater than or equal to a preset quantity of presentation times.

Further, the server triggers the end presentation command when finding, through statistics collection, that the quantity of presentation times of the media file meets the triggering condition, and sends the end presentation command to the terminal. After receiving the end presentation command, the terminal stops, according to the end presentation command, presenting the media file by using the application client when the application client is switched from the suspended state to the foreground state. Specifically, according to the end presentation command, the terminal no longer performs, after the application client is switched from the foreground state to the background state, the blocking operation of blocking, for the first preset duration, on the process of switching the application client from the background state to the suspended state. When the application client is switched from the suspended state switch to the foreground state, the application client in the foreground state is directly entered, and the media file is no longer presented.

In this embodiment, the server may further control an activity of the terminal of presenting the media file, and triggers the end presentation command after the quantity of presentation times of the media file reaches the triggering condition, so that the terminal no longer needs to present the media file when the application client is switched from the suspended state to the foreground state. This is highly controllable, and can reduce interruptions to a user.

Figure 11:
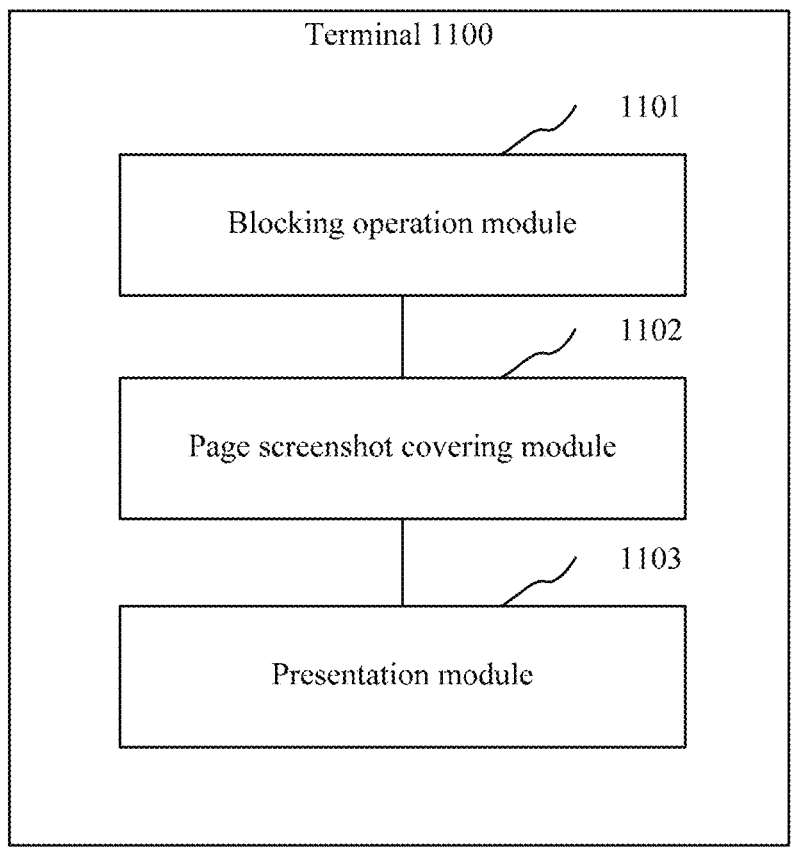
FIG. 11 is a structural block diagram of a terminal according to an embodiment.

As shown in FIG. 11, in an embodiment, this application further provides a terminal. An inner structure of the terminal may correspond to the structure shown in FIG. 2. All or some of the modules described below may be implemented by software, hardware, or a combination thereof. The terminal 1100 includes a blocking operation module 1101, a page screenshot covering module 1102, and a presentation module 1103.

The blocking operation module 1101 is configured to perform a blocking operation on a process of switching from a background state to a suspended state.

The page screenshot covering module 1102 is configured to cover a page screenshot by using a to-be-presented media file in the process of switching from the background state to the suspended state, the page screenshot being captured in a process of switching from a foreground state to the background state.

The presentation module 1103 is configured to present the media file covering the page screenshot in a process of switching from the suspended state to the foreground state.

By means of the terminal 1100, the application client is switched between states, and the blocking operation is performed on the process of switching from the background state to the suspended state, to buy time for a subsequent operation of covering the page screenshot, thereby improving a success rate of the operation of covering the page screenshot. When the application client is switched from the suspended state to the foreground state, the media file can be obtained and presented. This provides a new manner of presenting the media file, increases an impression rate of the media file, and can ensure the success rate of presenting the media file when the application client is switched from the suspended state to the foreground state.

In an embodiment, the blocking operation module 1101 is further configured to perform a blocking operation on a process in which an operating system switches the application client from the background state to the suspended state. The page screenshot covering module 1102 is further configured to cover the page screenshot by using the to-be-presented media file in the process in which the operating system switches the application client from the background state to the suspended state, the page screenshot being captured when the operating system switches the application client from the foreground state to the background state. The presentation module 1103 is further configured to present the media file covering the page screenshot when the operating system switches the application client from the suspended state to the foreground state.

In this embodiment, the blocking operation is performed on the process in which the operating system switches the application client from the background state to the suspended state, to buy time for the subsequent operation of covering the page screenshot, thereby improving a success rate of the operation of covering the page screenshot captured by the operating system. When the application client is switched the operating system from the suspended state to the foreground state, the media file can be obtained and presented. The application client is switched by the operating system between states, so that a new manner of presenting the media file is provided, an impression rate of the media file is increased, and the success rate of presenting the media file when the application client is switched from the suspended state to the foreground state can be ensured.

Figure 12:
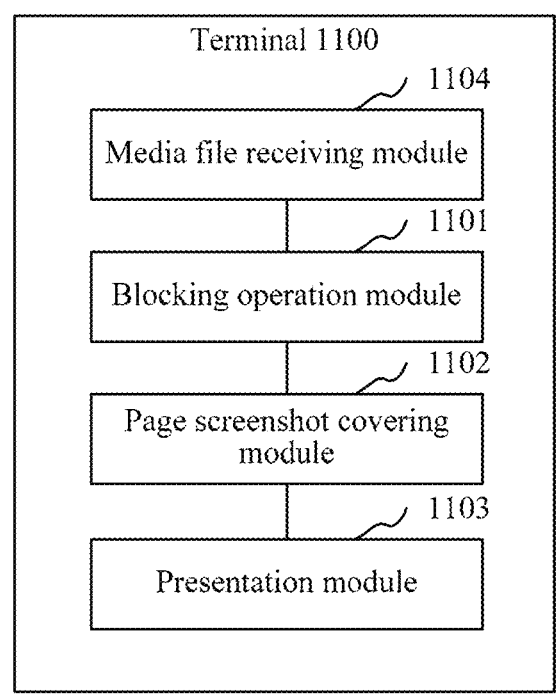
FIG. 12 is a structural block diagram of a terminal according to another embodiment.

As shown in FIG. 12, in an embodiment, the terminal 1100 further includes a media file receiving module 1104, configured to: receive a media file and a corresponding configuration file that are delivered by a server and store the media file and the configuration file.

The presentation module 1103 is further configured to present the media file covering the page screenshot according to a presentation parameter in the stored configuration file.

In this embodiment, the media file configured by the server may be presented, when the application client is switched from the suspended state to the foreground state, by using the media file and the configuration file that are configured by the server, and the media file is presented according to the presentation parameter configured by the server. The media file presented by using the application client and the presentation manner may be managed by the server remotely. This is highly controllable.

In an embodiment, the configuration file includes a media file presentation condition. The blocking operation module 1101 is further configured to detect whether the media file presentation condition is met; and perform, when the media file presentation condition is met, the blocking operation on the process of switching from the background state to the suspended state.

In this embodiment, when the application client is switched from the suspended state to the foreground state, and after the application client is switched from the foreground state to the background state, whether the media file presentation condition is met may be detected by using the media file and the configuration file that are configured by the server, so that the media file is presented when the application client is switched from the suspended state to the foreground state. The media file presented by using the application client, the presentation manner, and a presentation occasion may be managed by the server remotely, so that the media file can be more controllably presented.

Figure 13:
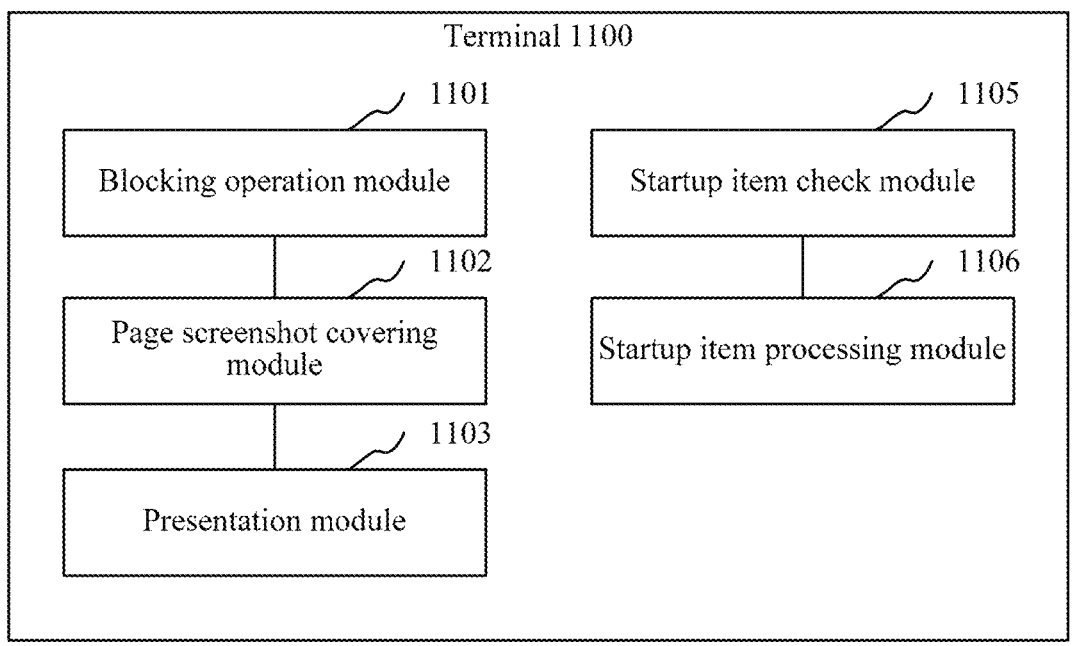
FIG. 13 is a structural block diagram of a terminal according to still another embodiment.

As shown in FIG. 13, in an embodiment, the terminal 1100 further includes a startup item check module 1105 and a startup item processing module 1106.

The startup item check module 1105 is configured to check, on startup, whether a startup item used for presenting a media file on startup exists.

The startup item processing module 1106 is configured to: load, if the startup item exists, the media file specified by the startup item and present the media file; and enter the foreground state when the loaded media file has been presented for preset duration.

In this embodiment, when the application client is started, a media file that needs to be presented when the application client is started may be identified by using a startup item identifier, so that a manner in which the media file may be presented by taking advantage of a long startup time of the application client in the process of starting the application client, may be combined with a manner in which the media file is presented when the application client is switched from the suspended state to the foreground state, thereby further increasing an impression rate of the media file. An advertisement media file generally needs to reach fixed impression. A combination of the two presentation manners can make an advertisement media file reach fixed impression more rapidly, thereby reducing interruptions to a user.

Figure 14:
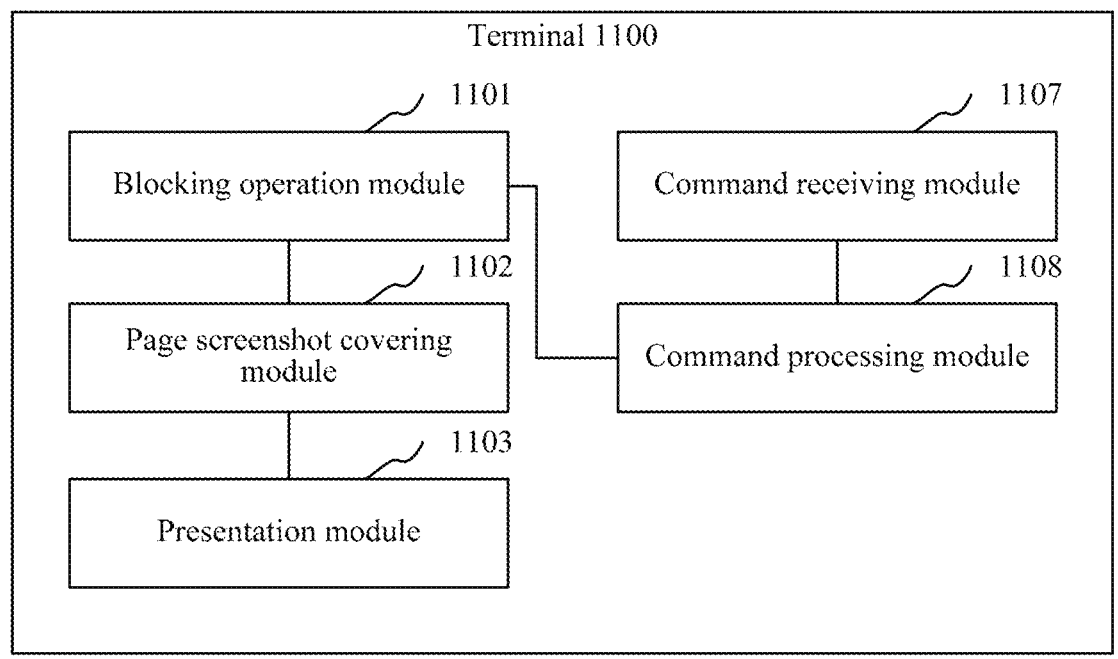
FIG. 14 is a structural block diagram of a terminal according to yet another embodiment.

As shown in FIG. 14, in an embodiment, the terminal 1100 further includes a command receiving module 1107 and a command processing module 1108.

The command receiving module 1107 is configured to receive an end presentation command sent by a server, the end presentation command being triggered by the server when finding, through statistics collection, that a quantity of presentation times of the media file meets a triggering condition.

The command processing module 1108 is configured to: stop, according to the end presentation command, performing the blocking operation on the processing of switching from the background state to the suspended state, and stop, in the process of switching from the background state to the suspended state, covering the page screenshot by using the to-be-presented media file.

In this embodiment, the server may further control an activity of the terminal of presenting the media file, and triggers the end presentation command after the quantity of presentation times of the media file reaches the triggering condition, so that the terminal no longer needs to present the media file when the application client is switched from the suspended state to the foreground state. This is highly controllable, and can reduce interruptions to a user.

A person of ordinary skill in the art may understand that all or some of the processes of the methods in the embodiments may be implemented by a computer program instructing relevant hardware. The computer program may be stored in a computer readable storage medium. When the program runs, the processes of the embodiments of the methods may be performed. The storage medium may be a non-transitory computer readable storage medium such as a magnetic disk, an optical disc, or a read-only memory (ROM), or may be a random access memory (RAM) or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments describe only several implementations of this application, and the descriptions are specific and detailed, but cannot be construed as a limitation to the patent scope of the present disclosure. It should be noted that various changes and improvements may further be made by a person of ordinary skill in the art without departing from the ideas of this application, and these changes and improvements all fall within the protection scope of this application. Therefore, the protection scope of the patent of this application shall be subject to the appended claims.

What is claimed is:

1. A media file presentation method, the method comprising:
   at a computing device having one or more processors and memory storing a plurality of programs to be executed by the one or more processors, detecting a first user request to switch an inactive application client from a foreground state to a background state;
   capturing a screenshot of a page presented by the application client in the foreground state before the application client is moved to the background state;
   performing a blocking operation to suspend backup of data for the application client;
   during the blocking operation, covering the page screenshot by presenting a media file;
   subsequent to the blocking operation, resuming the backing up of data and causing the application client to enter the background state;
   detecting a second user request to switch the application client from the background state to the foreground state;
   in response to the second user request, covering the page screenshot by presenting the media file while restoring the application client using the data from the backup; and
   replacing the media file with the application client in the foreground state.

2. The method according to claim 1, wherein the performing a blocking operation on a process of switching from a background state to a suspended state comprises:

after the application client is switched from the foreground state to the background state, performing a blocking operation of blocking, for first preset duration, a process of switching the application client from background state to the suspended state.

3. The method according to claim 1, wherein the method further comprises:

when the media file has been presented for second preset duration, entering a page that is presented when the application client is switched from the foreground state to the background state.

4. The method according to claim 1, wherein the performing a blocking operation on a process of switching from a background state to a suspended state comprises:

performing a blocking operation on a process in which an operating system switches the application client from the background state to the suspended state;

the covering a page screenshot by using a to-be-presented media file in the process of switching from the background state to the suspended state, the page screenshot being captured in a process of switching from a foreground state to the background state comprises:

covering the page screenshot by using the to-be-presented media file in the process in which the operating system switches the application client from the background state to the suspended state, the page screenshot being captured when the operating system switches the application client from the foreground state to the background state; and the presenting the media file covering the page screenshot in a process of switching from the suspended state to the foreground state comprises:

presenting the media file covering the page screenshot when the operating system switches the application client from the suspended state to the foreground state.

5. The method according to claim 1, wherein the method further comprises:

receiving a media file and a corresponding configuration file that are delivered by a server and storing the media file and the configuration file; and the presenting the media file covering the page screenshot comprises:

presenting the media file covering the page screenshot according to a presentation parameter in the stored configuration file.

6. The method according to claim 5, wherein the configuration file comprises a media file presentation condition; and the performing a blocking operation on a process of switching from a background state to a suspended state comprises:

detecting whether the media file presentation condition is met; and performing the blocking operation on the process of switching from the background state to the suspended state when the media file presentation condition is met.

7. The method according to claim 1, wherein before the performing a blocking operation on a process of switching from a background state to a suspended state, the method further comprises:

checking, on startup, whether a startup item used for presenting a media file on startup exists;

loading, if the startup item exists, the media file specified by the startup item and presenting the media file; and entering the foreground state when the loaded media file has been presented for preset duration.

8. The method according to claim 1, wherein the method further comprises:

receiving an end presentation command sent by a server, the end presentation command being triggered by the server when finding, through statistics collection, that a quantity of presentation times of the media file meets a triggering condition; and stopping, according to the end presentation command, performing the blocking operation on the processing of switching from the background state to the suspended state, and stopping, in the process of switching from the background state to the suspended state, covering the page screenshot by using the to-be-presented media file.

9. A computing device, comprising one or more processors, a memory, and a plurality of computer readable instructions that, when executed by the one or more processors, cause the computing device to perform the following operations:

detecting a first user request to switch an inactive application client from a foreground state to a background state;

capturing a screenshot of a page presented by the application client in the foreground state before the application client is moved to the background state;

performing a blocking operation to suspend backup of data for the application client;

during the blocking operation, covering the page screenshot by presenting a media file;

subsequent to the blocking operation, resuming the backing up of data and causing the application client to enter the background state;

detecting a second user request to switch the application client from the background state to the foreground state;

in response to the second user request, covering the page screenshot by presenting the media file while restoring the application client using the data from the backup; and replacing the media file with the application client in the foreground state.

10. The computing device according to claim 9, wherein the performing a blocking operation on a process of switching from a background state to a suspended state comprises:

after the application client is switched from the foreground state to the background state, performing a blocking operation of blocking, for first preset duration, a process of switching the application client from background state to the suspended state.

11. The computing device according to claim 9, wherein the operations further comprise:

when the media file has been presented for second preset duration, entering a page that is presented when the application client is switched from the foreground state to the background state.

12. The computing device according to claim 9, wherein the performing a blocking operation on a process of switching from a background state to a suspended state comprises:

performing a blocking operation on a process in which an operating system switches the application client from the background state to the suspended state;

the covering a page screenshot by using a to-be-presented media file in the process of switching from the background state to the suspended state, the page screenshot being captured in a process of switching from a foreground state to the background state comprises:

covering the page screenshot by using the to-be-presented media file in the process in which the operating system switches the application client from the background state to the suspended state, the page screenshot being captured when the operating system switches the application client from the foreground state to the background state; and the presenting the media file covering the page screenshot in a process of switching from the suspended state to the foreground state comprises:

presenting the media file covering the page screenshot when the operating system switches the application client from the suspended state to the foreground state.

13. The computing device according to claim 9, wherein the operations further comprise:

receiving a media file and a corresponding configuration file that are delivered by a server and storing the media file and the configuration file; and the presenting the media file covering the page screenshot comprises:

presenting the media file covering the page screenshot according to a presentation parameter in the stored configuration file.

14. The computing device according to claim 13, wherein the configuration file comprises a media file presentation condition; and the performing a blocking operation on a process of switching from a background state to a suspended state comprises:

detecting whether the media file presentation condition is met; and performing the blocking operation on the process of switching from the background state to the suspended state when the media file presentation condition is met.

15. The computing device according to claim 9, wherein before the performing a blocking operation on a process of switching from a background state to a suspended state, the operations further comprise:

checking, on startup, whether a startup item used for presenting a media file on startup exists;

loading, if the startup item exists, the media file specified by the startup item and presenting the media file; and entering the foreground state when the loaded media file has been presented for preset duration.

16. The computing device according to claim 9, wherein the operations further comprise:

receiving an end presentation command sent by a server, the end presentation command being triggered by the server when finding, through statistics collection, that a quantity of presentation times of the media file meets a triggering condition; and stopping, according to the end presentation command, performing the blocking operation on the processing of switching from the background state to the suspended state, and stopping, in the process of switching from the background state to the suspended state, covering the page screenshot by using the to-be-presented media file.

17. A non-transitory computer readable storage medium storing a plurality of computer readable instructions in connection with a computing device having one or more processors, wherein the plurality of computer readable instructions, when executed by the one or more processors, cause the computing device to perform the following operations:

detecting a first user request to switch an inactive application client from a foreground state to a background state;

capturing a screenshot of a page presented by the application client in the foreground state before the application client is moved to the background state;

performing a blocking operation to suspend backup of data for the application client;

during the blocking operation, covering the page screenshot by presenting a media file;

subsequent to the blocking operation, resuming the backing up of data and causing the application client to enter the background state;

detecting a second user request to switch the application client from the background state to the foreground state;

in response to the second user request, covering the page screenshot by presenting the media file while restoring the application client using the data from the backup; and replacing the media file with the application client in the foreground state.

18. The non-transitory computer readable storage medium according to claim 17, wherein the performing a blocking operation on a process of switching from a background state to a suspended state comprises:

after the application client is switched from the foreground state to the background state, performing a blocking operation of blocking, for first preset duration, a process of switching the application client from background state to the suspended state.

19. The non-transitory computer readable storage medium according to claim 17, wherein the operations further comprise:

when the media file has been presented for second preset duration, entering a page that is presented when the application client is switched from the foreground state to the background state.

20. The non-transitory computer readable storage medium according to claim 17, wherein the performing a blocking operation on a process of switching from a background state to a suspended state comprises:

performing a blocking operation on a process in which an operating system switches the application client from the background state to the suspended state;

the covering a page screenshot by using a to-be-presented media file in the process of switching from the background state to the suspended state, the page screenshot being captured in a process of switching from a foreground state to the background state comprises:

covering the page screenshot by using the to-be-presented media file in the process in which the operating system switches the application client from the background state to the suspended state, the page screenshot being captured when the operating system switches the application client from the foreground state to the background state; and the presenting the media file covering the page screenshot in a process of switching from the suspended state to the foreground state comprises:

presenting the media file covering the page screenshot when the operating system switches the application client from the suspended state to the foreground state.

* * * * *